United States Patent
Jung et al.

(10) Patent No.: US 8,594,585 B2
(45) Date of Patent: Nov. 26, 2013

(54) WIRELESS COMMUNICATION SYSTEM AND METHOD FOR SHARING SENSING ANTENNA, SENSING RECEIVER, DATA TRANSCEIVER ANTENNA, AND DATA TRANSCEIVER

(75) Inventors: Hoiyoon Jung, Daejeon (KR); Myung Sun Song, Daejeon (KR); Gwangzeen Ko, Daejeon (KR); Sunmin Lim, Daejeon (KR); Sang-Won Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 478 days.

(21) Appl. No.: 12/828,675

(22) Filed: Jul. 1, 2010

(65) Prior Publication Data

US 2011/0130101 A1 Jun. 2, 2011

(30) Foreign Application Priority Data

Nov. 30, 2009 (KR) .................. 10-2009-0116711

(51) Int. Cl.
*H04B 1/46* (2006.01)

(52) U.S. Cl.
USPC ............ 455/82; 455/69; 455/450; 455/509; 455/63.1; 455/63.3; 455/452.1; 370/462; 370/445; 370/329; 370/230

(58) Field of Classification Search
USPC ............ 455/82, 450, 452.1, 69, 509, 550.1, 455/63.1, 63.2, 63.3; 370/445, 462
See application file for complete search history.

(56) References Cited

U.S. PATENT DOCUMENTS

| | | | |
|---|---|---|---|
| 6,697,415 B1 * | 2/2004 | Mahany | 375/130 |
| 7,016,697 B2 * | 3/2006 | Ngai et al. | 455/522 |
| 7,564,816 B2 * | 7/2009 | McHenry et al. | 370/329 |
| 7,576,198 B1 * | 8/2009 | Kawasuji et al. | 540/54 |
| 7,710,919 B2 | 5/2010 | Woo et al. | |
| 7,778,170 B2 * | 8/2010 | Aboba et al. | 370/230 |
| 7,978,657 B2 * | 7/2011 | Choi et al. | 370/332 |
| 7,995,526 B2 * | 8/2011 | Liu et al. | 370/329 |
| 8,019,018 B2 * | 9/2011 | Cormier et al. | 375/316 |
| 8,073,452 B2 * | 12/2011 | Kossi et al. | 455/450 |
| 8,155,033 B2 * | 4/2012 | Chaudhri et al. | 370/278 |
| 8,155,649 B2 * | 4/2012 | McHenry et al. | 455/434 |
| 8,213,868 B2 * | 7/2012 | Du et al. | 455/63.1 |
| 8,259,830 B1 * | 9/2012 | McCloskey et al. | 375/260 |
| 8,326,313 B2 * | 12/2012 | McHenry et al. | 455/454 |
| 8,412,247 B2 * | 4/2013 | Junell et al. | 455/509 |
| 2009/0305639 A1 * | 12/2009 | Zhou et al. | 455/67.11 |

FOREIGN PATENT DOCUMENTS

| | | |
|---|---|---|
| JP | 2009-194730 | 8/2009 |
| KR | 10-2006-0087839 | 8/2006 |
| KR | 10-2008-0063506 | 7/2008 |
| KR | 10-2009-0008738 | 1/2009 |

\* cited by examiner

*Primary Examiner* — Marceau Milord

(74) *Attorney, Agent, or Firm* — Nelson Mullins Riley & Scarborough LLP

(57) ABSTRACT

Provided is a method of sharing a data transceiver, a data transceiver antenna, a sensing receiver, and a sensing antenna, and a wireless communication system. The data transceiver and the sensing receiver, or the data transceiver antenna and the sensing antenna may be flexibly shared based on a condition. During a period where a transceiver and an antenna are utilized, the transceiver and the antenna may be utilized for different purposes. The transceiver and the antenna may be flexibly shared to increase efficiency in using the transceiver and the antenna, and thus, a spectrum sensing and a data transmission and reception performed in a system may be improved.

17 Claims, 14 Drawing Sheets

FIG. 2 (CONVENTIONAL ART)

| DATA TRANSCEIVER AND DATA TRANSCEIVER ANTENNA | DATA TRANSMISSION AND RECEPTION | QP | DATA TRANSMISSION AND RECEPTION | A | DATA TRANSMISSION AND RECEPTION | QP | DATA TRANSMISSION AND RECEPTION | A |
|---|---|---|---|---|---|---|---|---|

| SENSING RECEIVER AND SENSING ANTENNA | OUTBAND SENSING | B | IN BAND SENSING | B | OUTBAND SENSING | B | IN BAND SENSING | B | OUTBAND SENSING |
|---|---|---|---|---|---|---|---|---|---|

FIG. 5

| | | | | | | | | |
|---|---|---|---|---|---|---|---|---|
| SENSING RECEIVER | OUTBAND SENSING | B | IN BAND SENSING | B | OUTBAND SENSING | A | OUTBAND SENSING | B | IN BAND SENSING | B | OUTBAND SENSING |
| CONVENTIONAL DATA TRANSCEIVER | DATA TRANSMISSION AND RECEPTION | QP | DATA TRANSMISSION AND RECEPTION | DATA TRANSMISSION AND RECEPTION | A | DATA TRANSMISSION AND RECEPTION | QP | DATA TRANSMISSION AND RECEPTION |
| PROPOSED DATA TRANSCEIVER | DATA TRANSMISSION AND RECEPTION | IN BAND SENSING | DATA TRANSMISSION AND RECEPTION | OUTBAND SENSING | DATA TRANSMISSION AND RECEPTION | DATA TRANSMISSION AND RECEPTION | IN BAND SENSING | DATA TRANSMISSION AND RECEPTION | OUTBAND SENSING |

FIG. 7

| DATA TRANSCEIVER | DATA TRANSMISSION AND RECEPTION | | QP | DATA TRANSMISSION AND RECEPTION | A | DATA TRANSMISSION AND RECEPTION | | QP | DATA TRANSMISSION AND RECEPTION | A |
|---|---|---|---|---|---|---|---|---|---|---|
| | B | | | B | | B | B | | B | |
| CONVENTIONAL SENSING RECEIVER | OUTBAND SENSING | B | IN BAND SENSING | B | OUTBAND SENSING | B | OUTBAND SENSING | IN BAND SENSING | B | OUTBAND SENSING |
| PROPOSED SENSING RECEIVER | OUTBAND SENSING | B | IN BAND SENSING | | OUTBAND SENSING | | OUTBAND SENSING | IN BAND SENSING | | OUTBAND SENSING |

FIG. 13

| | | | | | | | | | | | |
|---|---|---|---|---|---|---|---|---|---|---|---|
| SENSING TRANSCEIVER ANTENNA | DATA RECEPTION | DATA TRANSMISSION | QP | DATA RECEPTION | DATA TRANSMISSION | B | A | DATA TRANSMISSION | DATA RECEPTION | QP | DATA TRANSMISSION | DATA RECEPTION | A |
| CONVENTIONAL SENSING ANTENNA | OUTBAND SENSING | B | IN BAND SENSING | | | | OUTBAND RECEPTION | | OUTBAND SENSING | B | IN BAND SENSING | | OUTBAND SENSING |
| PROPOSED SENSING ANTENNA | OUTBAND RECEPTION / DATA RECEPTION | DATA TRANSMISSION | IN BAND SENSING | DATA RECEPTION | DATA TRANSMISSION | OUTBAND SENSING | OUTBAND SENSING / DATA RECEPTION | DATA TRANSMISSION | DATA RECEPTION | IN BAND SENSING | DATA TRANSMISSION | DATA RECEPTION | OUTBAND SENSING |

WIRELESS COMMUNICATION SYSTEM AND METHOD FOR SHARING SENSING ANTENNA, SENSING RECEIVER, DATA TRANSCEIVER ANTENNA, AND DATA TRANSCEIVER

CROSS-REFERENCE TO RELATED APPLICATION

This application claims the benefit of Korean Patent Application No. 10-2009-0116711, filed on Nov. 30, 2009, in the Korean Intellectual Property Office, the disclosure of which is incorporated herein by reference.

BACKGROUND

1. Field of the Invention

The present invention relates to a method of sharing a data transceiver, a data transceiver antenna, sensing receiver, and a sensing antenna.

2. Description of the Related Art

A cognitive radio (CR) system may recognize that a primary user does not use a frequency band that is already allocated to the primary user and may use the frequency band. To prevent interference to the primary user, the CR system may recognize an appearance when the primary user appears in the band being used by the CR, and may yield the band to the primary user. Sensing whether the primary user uses a channel being used by the CR system may be referred to as an in-band sensing.

In the case that the primary user appears in the channel being used by the CR system, the CR system may continuously perform a spectrum sensing with respect to a candidate channel so that the CR system may switch from the channel being used when the primary user appears in the channel. Sensing candidate channels that may be used as substitutions, in the case that the primary user uses the channel being used, may be referred to as an out-band sensing.

The in-band sensing is a process where the CR system determines whether the primary user appears in the channel being used, and the in-band sensing may be performed when a channel that the CR system desires to be used is sensed by the CR system. When a data transmission and reception and a spectrum sensing are simultaneously performed during the in-band sensing, an interference signal due to the data transmission and reception may affect the spectrum sensing, and thus, the simultaneous performing of the data transmission and reception and the spectrum sensing may be impossible. Accordingly, a transmission quiet period (QP) that stops the data transmission and reception may be exist, during the data transmission and reception, to perform the in-band sensing, and the in-band sensing may be performed during the transmission QP.

The out-band sensing is a process where the CR system prepares candidate channels to immediately substitute for the channel being used when the primary user appears in the channel being used. The out-band may not be currently used by the CR system. When a CR device includes a separate sensing receiver and a sensing antenna the data transmission and reception may be performed using the data transceiver and the data transceiver antenna in an in-band, and simultaneously the out-band sensing may be performed using the sensing receiver and the sensing antenna in an out-band. The data transmission and reception may not pause for performing the out-band sensing in the CR system, and thus the CR system has an advantage of performing the out-band sensing without affecting a quality of service (QoS). Because of the above advantage followed by including the separate sensing receiver and the sensing antenna, the CR system is considered to include the receiver and the sensing antenna in addition to the data transceiver and the data transceiver antenna, and a number of prototypes have developed to have the same format as the above CR system When the spectrum sensing is performed, the in-band sensing and the out-band sensing are not always performed. The in-band sensing may be performed based on a predetermined 'quiet period' and the out-band sensing may also be performed based on a predetermined schedule. The data transmission and reception may depend on a system. In a case of a time division multiple access (TDMA) system, the data transmission and reception may not be continuously performed, and the data transmission and reception may be performed in a predetermined period of time based on a predetermined schedule and may not be performed at other times. When the data transceiver, the data transceiver antenna, the sensing receiver, and the sensing antenna are used for only their own purposes, the data transceiver and the data transceiver antenna, the sensing receiver, and the sensing antenna may be inefficiently utilized.

FIG. 1 illustrates a conventional wireless communication system 100 including a data transceiver 150, a data transceiver antenna 140, a sensing receiver 120, and a sensing antenna 110.

Referring to FIG. 1, the sensing receiver 120 may be connected to the sensing antenna 110 to receive sensing data for a spectrum sensing, and may transmit the received sensing data to a sensing signal processing unit 130 performing a spectrum sensing calculation. In this instance, the data transceiver 150 may be connected to both the data transceiver antenna 140 and a data signal processing 160 processing transmitted or received data, to perform a data transmission and reception.

FIG. 2 illustrates, based on time, an operation of a data transceiver and a sensing receiver in the conventional wireless communication system of FIG. 1.

Referring to FIG. 2, the data transceiver 150 and the data transceiver antenna 140 may be used for a data transmission and reception, and may perform the data transmission and reception when data to be transmitted or to be received based on a predetermined transmission and reception schedule exist in the wireless communication system 100. When data to be transmitted or to be received does not exist, such as 'A', the data transmission and reception may not be performed and the data transceiver 150 and the data transceiver antenna 140 may remain in a standby mode. During a transmission QP, the data transmission and reception may not be performed and the data transceiver 150 and the data transceiver antenna 140 may remain in the standby mode to synchronize with the spectrum sensing and to smoothly perform an in-band sensing for a channel being used.

The sensing receiver 120 and the sensing antenna 110 may be used for receiving data for a spectrum sensing, and may perform an in-band sensing or an out-band sensing based on a predetermined sensing schedule. The in-band sensing may synchronize with the data transmission and reception and may receive data from an in-band channel during a transmission QP. The out-band sensing may be performed in a different channel from a channel for the data transmission and reception, and thus may be performed based on a predetermined sensing schedule regardless of the data transmission and reception. The sensing process may have a period of a standby mode, such as 'B', where the sensing data is not received.

SUMMARY

An aspect of the present invention provides a method of sharing a data transceiver, a data transceiver antenna, a sensing receiver, and a sensing antenna, depending on a case, in a wireless communication system utilizing a spectrum sensing, to increase an efficiency in utilizing a transceiver and an antenna, and to improve a performance of a system.

For example, when a data transmission is performed and a spectrum sensing is not performed, a sensing receiver may be utilized for a data transmission and reception to improve a performance of the data transmission and reception. When the data transmission is not performed and the spectrum sensing is performed, the data transceiver may be utilized for receiving spectrum sensing data to increase an accuracy of the spectrum sensing. When a data transceiver antenna is not used for a data transmission, the corresponding antenna may be utilized for receiving sensing data, and a sensing antenna may be utilized for receiving data.

According to an aspect of the present invention, there is provided a method of sharing a data transceiver and a sensing receiver, and the method includes determining whether a current time period is a data transmission-and-reception period, determining whether the current time period is a transmission quiet period (QP), when the current time period is different from the data transmission-and-reception period, and utilizing the data transceiver with the sensing receiver to receive the sensing data when the current time period is the transmission QP.

According to another aspect of the present invention, there is provided a method of sharing a data transceiver and a sensing receiver, and the method includes determining whether a current time period is a sensing period, determining the current time period is a data transmission-and-reception period when the current time period is different from the sensing period, and utilizing the sensing receiver with the data transceiver to receive the data when the current time period is the data transmission-and-reception period and a time period of a CR device contained in the sensing receiver is a data reception period.

According to another aspect of the present invention, there is provided a method of sharing a data transceiver antenna and a sensing antenna, and the method includes determining whether a current time period is a data transmission-and-reception period, and connecting the data transceiver antenna with the sensing receiver to receive the sensing data when the current time period is different from the data transmission-and-reception period.

According to another aspect of the present invention, there is provided a method of sharing a data transceiver antenna and a sensing antenna, and the method includes determining whether a current time period is a sensing period, and connecting the sensing antenna with the data transceiver to transmit or to receive the data when the current time period is different from the sensing period.

According to another aspect of the present invention, there is provided a wireless communication system including a signal processing unit to determine whether a current time period is a data transmission-and-reception period, a data transceiver to transmit or to receive data when the current time period is the data transmission-and-reception period, and to receive sensing data when the current time period is different from the data transmission-and-reception period and is a transmission QP, a sensing signal processing unit to determine whether the current time period is a sensing period, and a sensing receiver to receive the sensing data when the current time period is the sensing period, and to receive the data, together with the data transceiver, when the current time period is the data transmission-and-reception period as opposed to being the sensing period and a time period of a CR device contained in the sensing receiver is a data reception period.

Additional aspects, features, and/or advantages of the invention will be set forth in part in the description which follows and, in part, will be apparent from the description, or may be learned by practice of the invention.

EFFECT

According to an embodiment, a data transceiver and a data transceiver antenna may be utilized for receiving sensing data, and thus, a spectrum sensing of a wireless communication system may be improved.

According to an embodiment, a sensing receiver and a sensing antenna may be utilized for transmitting and receiving data, and thus, a transmission and reception of a wireless communication system may be improved.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 2 is a diagram, based on time, illustrating an operation of a data transceiver and a sensing receiver in the conventional wireless communication system of FIG. 1;

FIG. 5 is a diagram illustrating, based on time, a change in an operation when a data transceiver is utilized as a sensing receiver, depending on a condition, in the same manner as FIG. 4;

FIG. 7 is a diagram illustrating, based on time, a change in an operation when a sensing receiver is utilized as a data transceiver, depending on a condition, in the same manner as FIG. 6;

FIG. 13 is a diagram illustrating, based on time, an operation when a sensing antenna is utilized as a data transceiver antenna, depending on a case.

DETAILED DESCRIPTION

Figure 1:
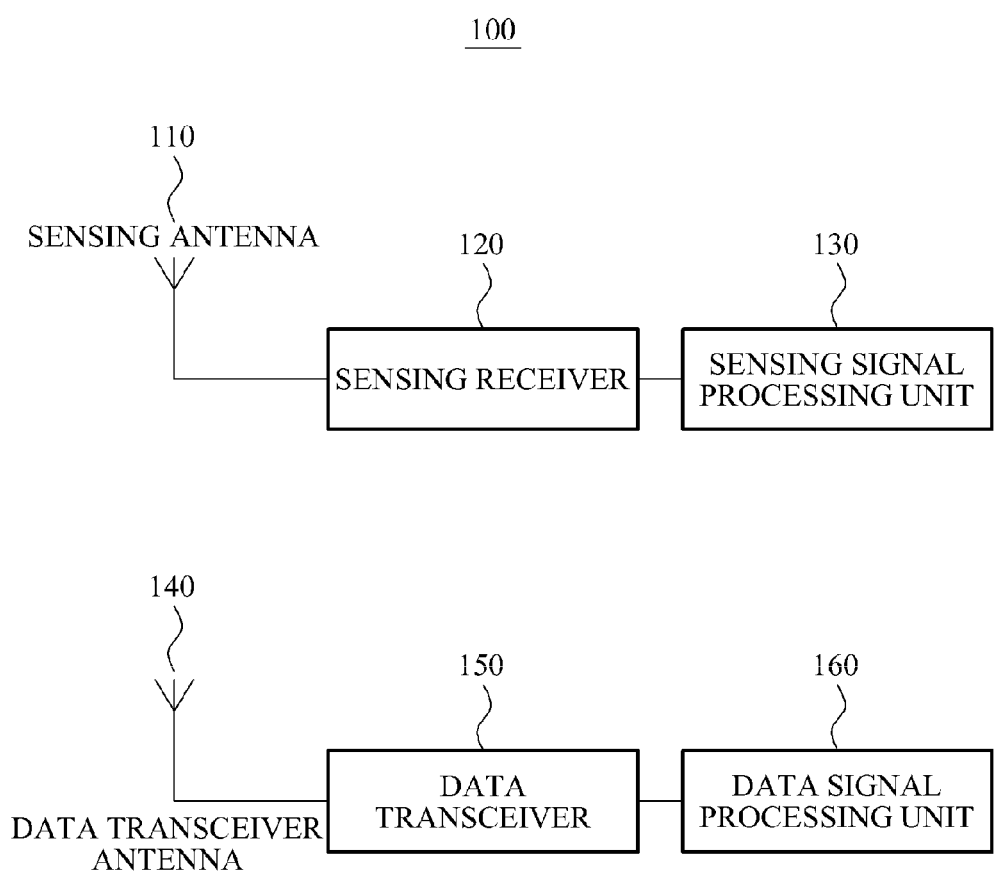
FIG. 1 is a diagram illustrating a conventional wireless communication system including a data transceiver, a data transceiver antenna, a sensing receiver, and a sensing antenna.

Reference will now be made in detail to embodiments of the present invention, examples of which are illustrated in the accompanying drawings, wherein like reference numerals refer to the like elements throughout. Embodiments are described below to explain the present invention by referring to the figures.

1. A Format for Sharing Data Transceiver and Sensing Receiver

Figure 3:
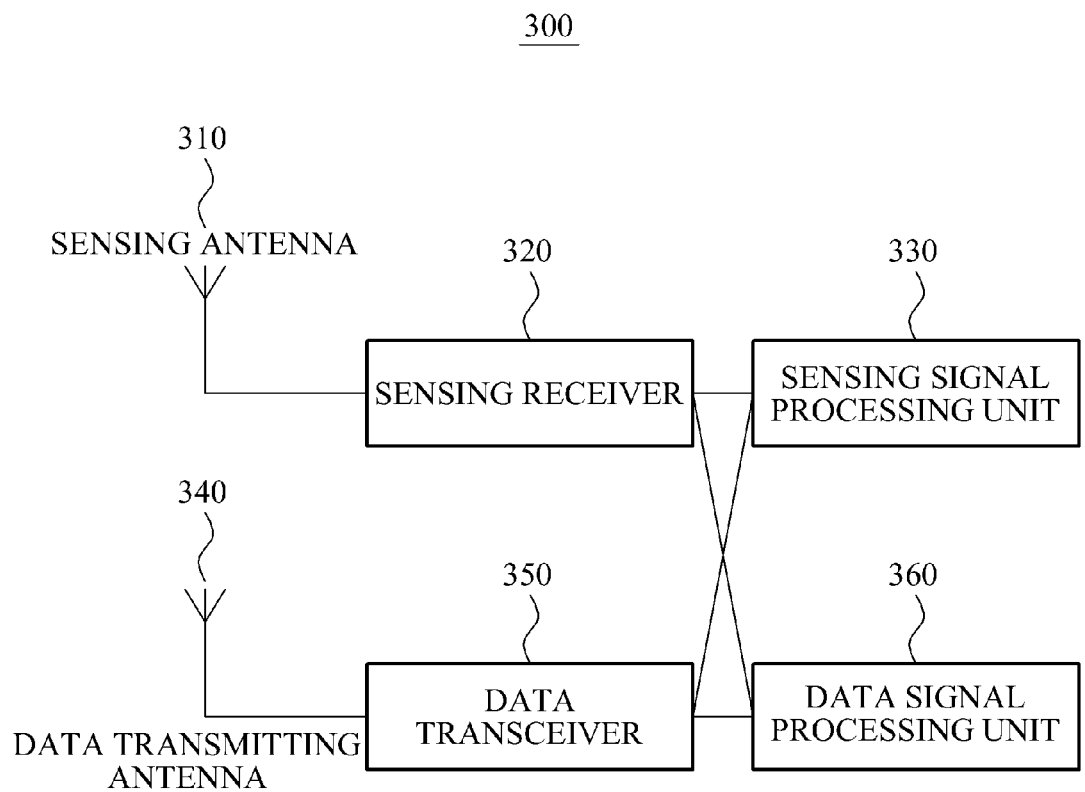
FIG. 3 is a block diagram illustrating a format for sharing a data transceiver and a sensing receiver according to an embodiment of the present invention.

FIG. 3 illustrates a format for sharing a data transceiver and a sensing receiver according to an embodiment of the present invention.

Referring to FIG. 3, a wireless communication system 300 may include a sensing antenna 310, a sensing receiver 320, a sensing signal processing unit 330, a data transceiver antenna 340, a data transceiver 350, and a data signal processing unit 360.

Unlike a conventional wireless communication system, in the wireless communication system 300, depending on a condition, the sensing receiver 320 may be connected to the data signal processing unit 360 processing transmitted or received data or the data transceiver 350 may be connected to the sensing signal processing unit 330 processing a spectrum sensing signal, using a switch and the like. In this case, the data transceiver 350 may be connected to the sensing signal processing unit 330 and may be used for the same purpose of the sensing receiver 320, and the sensing receiver 320 may be connected to the data signal processing unit 360 and may be used for the same purpose of the data transceiver 350. Each case is described as follows.

A. A Method of Utilizing a Data Transceiver as a Sensing Receiver

Figure 4:
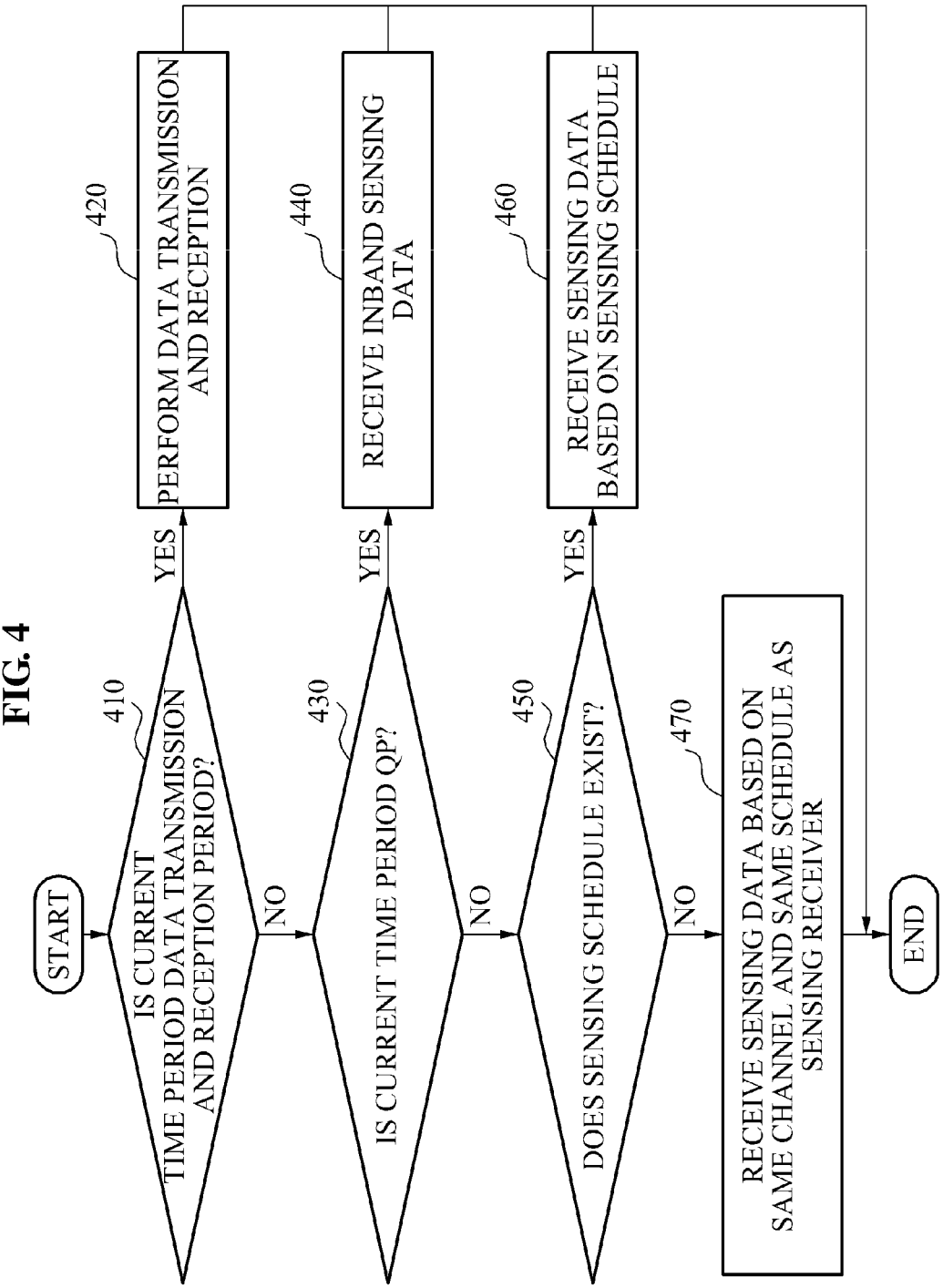
FIG. 4 is a flowchart illustrating an example of utilizing a data transceiver as a sensing receiver, depending on a condition.

FIG. 4 illustrates an example of utilizing a data transceiver as a sensing receiver, depending on a condition.

FIG. 4 illustrates the wireless communication system 300 that adopts a scheme, such as a TDMA scheme, where a data transmission time is determined based on a predetermined schedule.

The data signal processing unit 360 determines whether a current time period is a data transmission-and-reception period in operation 410. When the current time period is the data transmission-and-reception period, the data transceiver 350 performs a data transmission and reception in operation 420.

When the current time period is different from the data transmission-and-reception period, the data signal processing unit 360 determines whether the current time period is a transmission quiet period (QP) in operation 430. When the current time period is the transmission QP, the data transceiver 350, together with the sensing receiver 320, receives in-band sensing data in operation 440. For example, when the current time period is different from the data transmission-and-reception period is a period where data is not transmitted, and the current time period may be one of a period where is scheduled to not perform a transmission based on a data transmission schedule and a transmission QP where the transmission pauses for performing an in-band sensing.

When the current time period is different from the transmission QP, the data signal processing unit 360 determines whether a separate sensing schedule exists for utilizing the data transceiver 350 for a spectrum sensing in operation 450. When the sensing schedule exists, the data transceiver 350 receives sensing data based on the sensing schedule in operation 460. When the sensing schedule does not exist, the data transceiver 350 receives the sensing data using the same channel and the same schedule as the sensing receiver 320 in operation 470.

FIG. 5 illustrates, based on time, a change in an operation when a data transceiver is utilized as a sensing receiver, depending on a condition, in the same manner as FIG. 4.

Referring to FIG. 5, the data transceiver 350 may be effectively utilized for a spectrum sensing during a data transmission and reception pause period. In this case, when the data transceiver 350 is utilized for an in-band sensing, a channel of a data transceiver, during a data transmission and reception, is already set to an in-band mode, and thus, a separate process of changing a channel may not be performed. However, for the in-band sensing, the data transceiver 350 may transmit received sensing data to the sensing signal processing unit 330 as opposed to transmitting to the data signal processing unit 360.

Information associated with the transmission QP is predetermined in the wireless communication system 300, and thus, the wireless communication system 300 may be conveniently embodied using a simple method based on a QP schedule, such as a switching and the like. When the data transceiver 350 is utilized for the in-band sensing, a QoS of the wireless communication system 300 may be maintained using a transmission QP that is the same period of time as a conventional method, and the data transceiver 350 may be additionally utilized for a spectrum sensing to obtain a larger amount of sensing data and thus, a performance of the spectrum sensing may be improved. In a case where the data transceiver 350 performs sensing an out-band channel, when the data transceiver 350 performs the sensing based on the same channel and the same schedule, a performance of an out-band sensing may be improved. When the data transceiver 350 is operated based on a separate sensing schedule, the data transceiver 350 may perform sensing the same number of out-band channels during a shorter time than a case where the present invention is not utilized.

B. A Method of Utilizing a Sensing Receiver as a Data Transceiver

Figure 6:
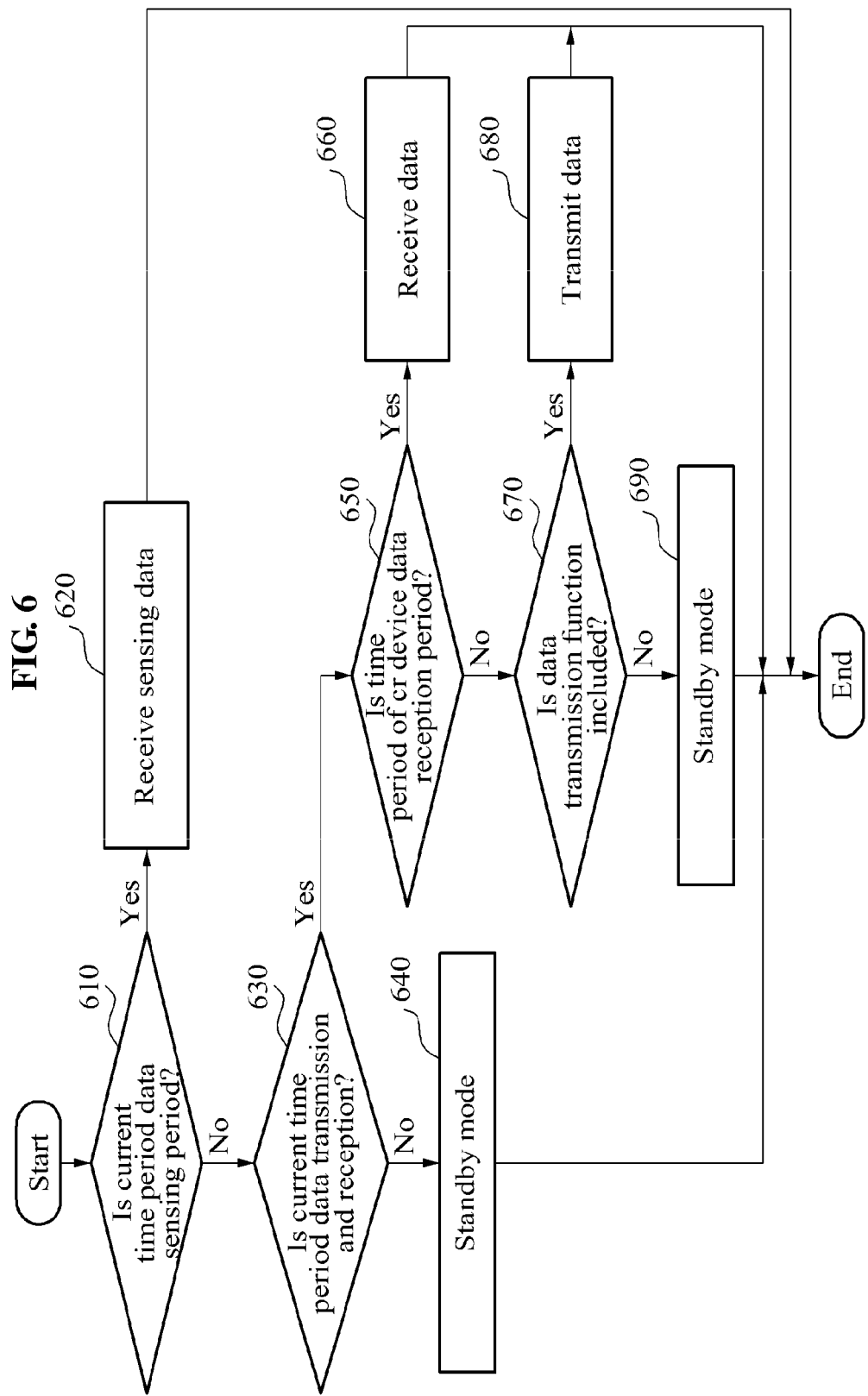
FIG. 6 is a flowchart illustrating an example of utilizing a sensing receiver as a data transceiver, depending on a condition.

FIG. 6 is a flowchart illustrating an example of utilizing a sensing receiver as a data transceiver, depending on a condition.

A spectrum sensing is performed based on a predetermined sensing schedule in a cognitive radio (CR) system the spectrum sensing may not be always performed. When a data reception for a sensing is not performed, the sensing receiver 320 may not be used. A method of utilizing the sensing receiver 320 as a data transceiver, during a time where a sensing data reception is not performed, to improve an efficiency in utilizing the sensing receiver 320, is described with reference to FIG. 6.

The sensing signal processing unit 330 determines whether a current time period is a sensing period in operation 610. When the current time period is the sensing period, the sensing receiver 320 receives sensing data in operation 620. When the current time period is different from the sensing period, the sensing signal processing unit 330 determines whether the current time period is a data transmission-and-reception period in operation 630. When the current time period is different from the data transmission-and-reception period, the sensing receiver 320 may not be utilized and may stand by in operation 640.

When the current time period is the data transmission-and-reception period, whether a time period of a CR device including the sensing receiver 320 is the data reception period is determined in operation 650. The sensing receiver 320 receives data when the time period of the CR device is the data reception period in operation 660. The sensing signal processing unit 330 determines whether the time period of the CR device is a data transmission period and determines whether the included sensing receiver 320 includes a data transmission function in operation 670. When the sensing receiver 320 includes the data transmission function, the sensing receiver 320 may transmit data in operation 680. When the sensing receiver 320 includes only a reception function, the sensing receiver 320 may stand by in operation 690.

FIG. 7 illustrates, based on time, a change in an operation when a sensing receiver is utilized as a data transceiver, depending on a condition, in the same manner as FIG. 6.

Referring to FIG. 7, the sensing receiver 320 is effectively utilized for transmitting data during a period where the sensing receiver 320 does not receive sensing data. In a general system, a sensing schedule and a data transmission-and-reception period are defined in advance and thus, information associated with the sensing schedule and the data transmission-and-reception period may be obtained, and when the data transmission and reception is performed in a period, such as 'B', using the corresponding information, the sensing receiver 320 may be utilized for the data transmission and reception. The sensing receiver 320 may generally receive a communication signal, and thus, may not have a difficulty in receiving data. The sensing receiver 320 may transmit the received data to the data signal processing unit 360 as opposed to transmitting to the sensing signal processing unit 330. Only when the sensing receiver 320 includes a format for a data transmission, may the sensing receiver 320 be utilized for the data transmission. This may depend on an embodiment.

Figure 8:
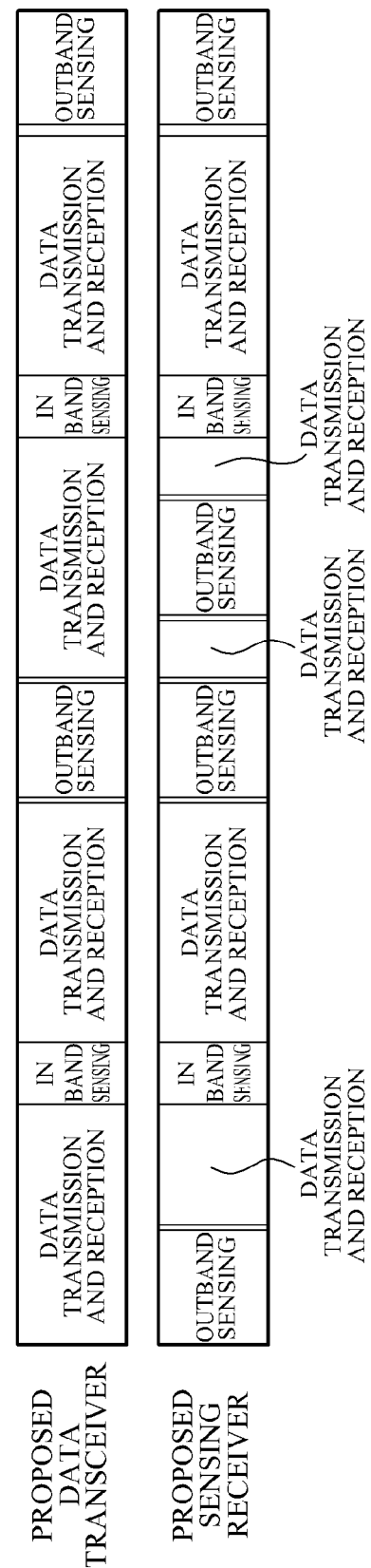
FIG. 8 is a diagram illustrating, based on time, an operation of each transceiver when the present invention is expanded.

FIG. 8 illustrates, based on time, an operation of each transceiver when the present invention is expanded.

Referring to FIG. 8, the data transceiver 350 is utilized as a sensing receiver or the sensing receiver 320 is utilized as a data transceiver 350. Depending on a system, the data transceiver 350 and the sensing receiver 320 may be shared during a small part of a period as illustrated in FIG. 8.

Referring to FIG. 8, a CR device have a single data transceiver and a single sensing receiver. However, embodiments may be applicable to a CR device having one or more data transceivers and one or more sensing receivers. Also, embodiments may be generally applicable to a CR device having a plurality of transceiver without distinction of a data transceiver and a sensing receiver.

2. A Format for Sharing a Data Transceiver Antenna and a Sensing Antenna

In a wireless communication system including a separate sensing antenna in addition to a data transceiver antenna for performing a spectrum sensing, a probability that the data transceiver antenna has the same configuration as the sensing antenna is high since an operation frequency band of the data transceiver antenna is the same as the sensing antenna. An antenna may be connected to various transceivers and may perform a transmission and reception with respect to a corresponding service frequency band. For example, when a single antenna is connected to both a single data transceiver and a single sensing receiver, a data reception in an in-band for the data transceiver and a sensing data reception in an out-band may be simultaneously performed. The wireless communication system may share the data transceiver antenna and the sensing antenna, and thus, an efficiency in utilizing the antenna increases and a performance of the wireless communication system may be improved.

Figure 9:
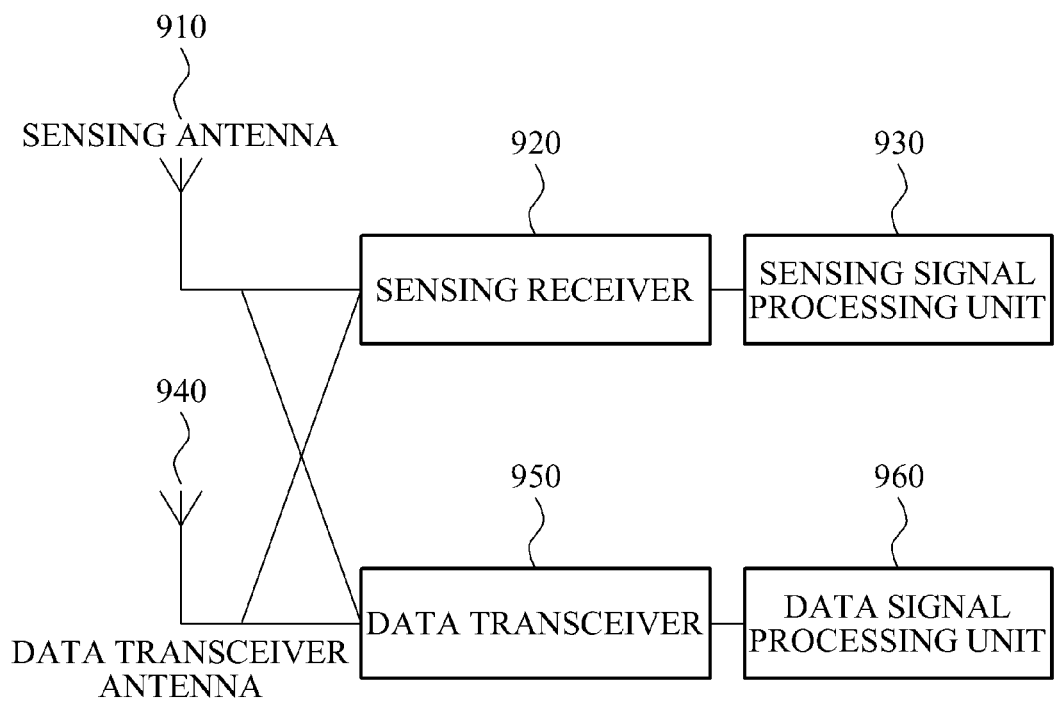
FIG. 9 is a block diagram illustrating a format for sharing a data transceiver antenna and a sensing antenna according to an embodiment of the present invention.

FIG. 9 illustrates a format for sharing a data transceiver antenna and a sensing antenna according to an embodiment of the present invention.

Referring to FIG. 9, a wireless communication system 900 includes a sensing antenna 910, a sensing receiver 920, a sensing signal processing unit 930, a data transceiver antenna 940, a data transceiver 950, and a data signal processing unit 960.

In the wireless communication system 900, unlike a conventional wireless communication system, the sensing antenna 910 may be connected to the data transceiver 950 and the data transceiver antenna 940 may be connected to the sensing receiver 920 depending on a condition. In this case, the transceiver antenna 940 may be connected to the sensing receiver 920 and may be utilized as a sensing antenna, and the sensing antenna 910 may be connected to the data transceiver 950 and may be utilized as a data transceiver antenna. Each case is described as follows.

A. A Method of Utilizing a Data Transceiver Antenna as a Sensing Antenna

Figure 10:
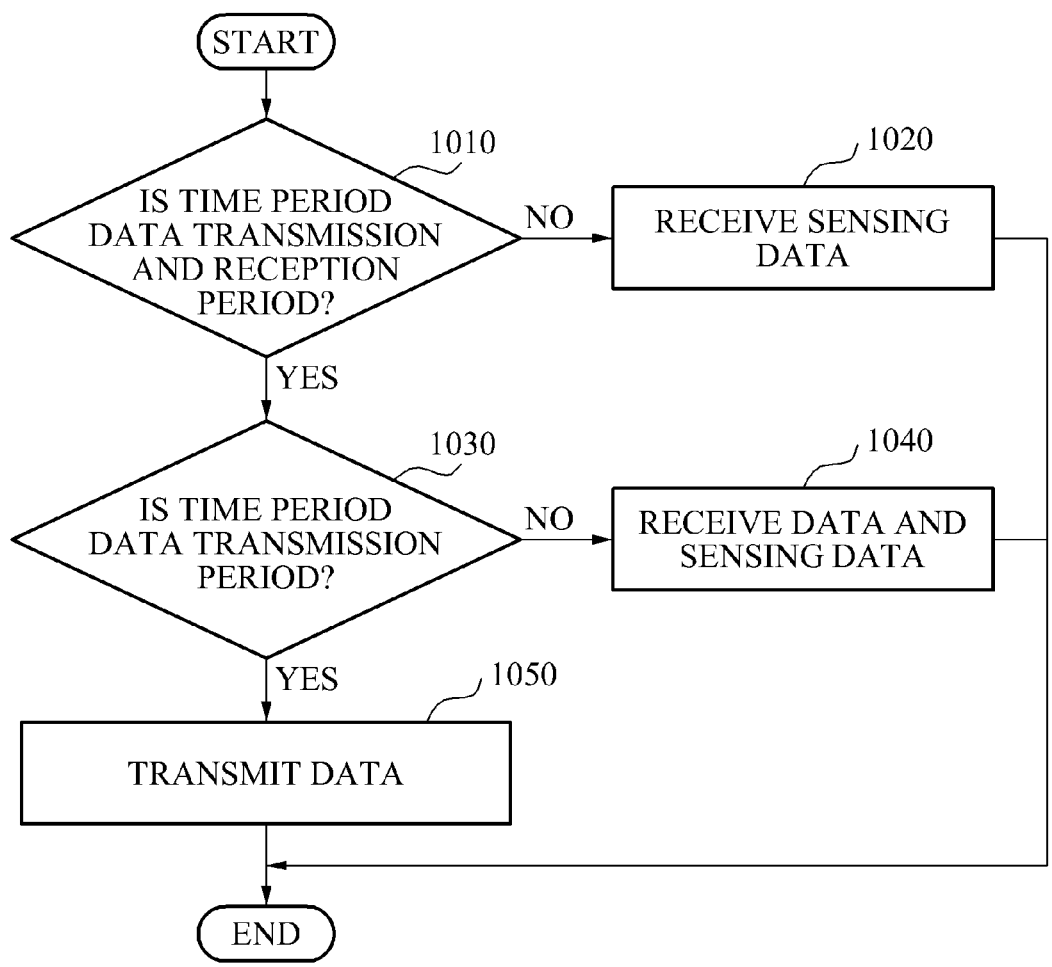
FIG. 10 is a flowchart illustrating an example of utilizing a transceiver antenna as a sensing antenna, depending on a condition.

FIG. 10 is a flowchart illustrating an example of utilizing a transceiver antenna as a sensing antenna, depending on a condition.

Referring to FIG. 10, a data signal processing unit 960 determines whether a time period is a data transceiver period in operation 1010. When the time period is different from the data transceiver period, the data transceiver antenna 940 may be connected to the sensing receiver 920 as opposed to being connected to the data transceiver 950, and may be utilized for receiving sensing data in operation 1020.

The data signal processing unit 960 determines whether the time period is both a data transmission-and-reception period and the data transmission period in operation 1030. When the time period is the data transmission period, the data transceiver antenna 940 may not simultaneously perform both a data transmission and a sensing reception, and thus the data transceiver antenna 940 may be utilized for transmitting data in operation 1050. When the time period is a data reception period, the data transceiver antenna 940 may be connected to both the data transceiver 950 and the sensing receiver 920, and thus, the data transceiver antenna may receive data in the in-band and may receive sensing data in the out-band in operation 1040. In this case, information associated with the data transceiver period of the wireless communication system is predetermined, and thus, only when a dynamic connection between the data transceiver antenna and the data transceiver is performed, may the described utilization be easily embodied.

Figure 11:
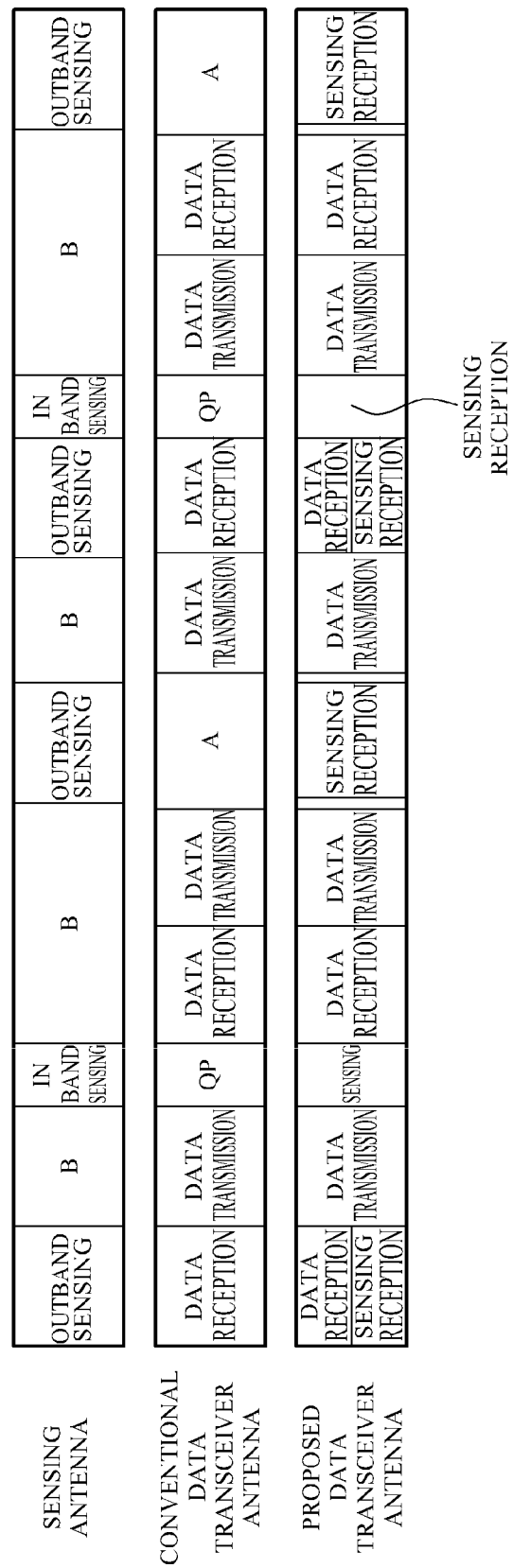
FIG. 11 is a diagram illustrating, based on time, an operation when a transceiver antenna is utilized as a sensing antenna.

FIG. 11 illustrates, based on time, an operation when a transceiver antenna 940 is utilized as a sensing antenna.

Referring to FIG. 11, the data transceiver antenna 940 may perform a data reception through a data transceiver 950 in an in-band, and may simultaneously perform a sensing reception through a sensing receiver 920 in an out-band and thus, the wireless communication system 900 may be more effectively utilized. A time period that is not utilized for a data transmission, such as 'A' generated when a conventional method is used, may be utilized for a sensing reception to increase an accuracy of a sensing. When a plurality of sensing receivers exist, a first sensing receiver may be connected to a sensing antenna and a second sensing receiver may be connected to a data transceiver antenna, and thus, may be utilized in the same manner as the above description and may be utilized in a number of different manners.

B. A Method of Utilizing a Sensing Antenna as a Data Transceiver Antenna

Figure 12:
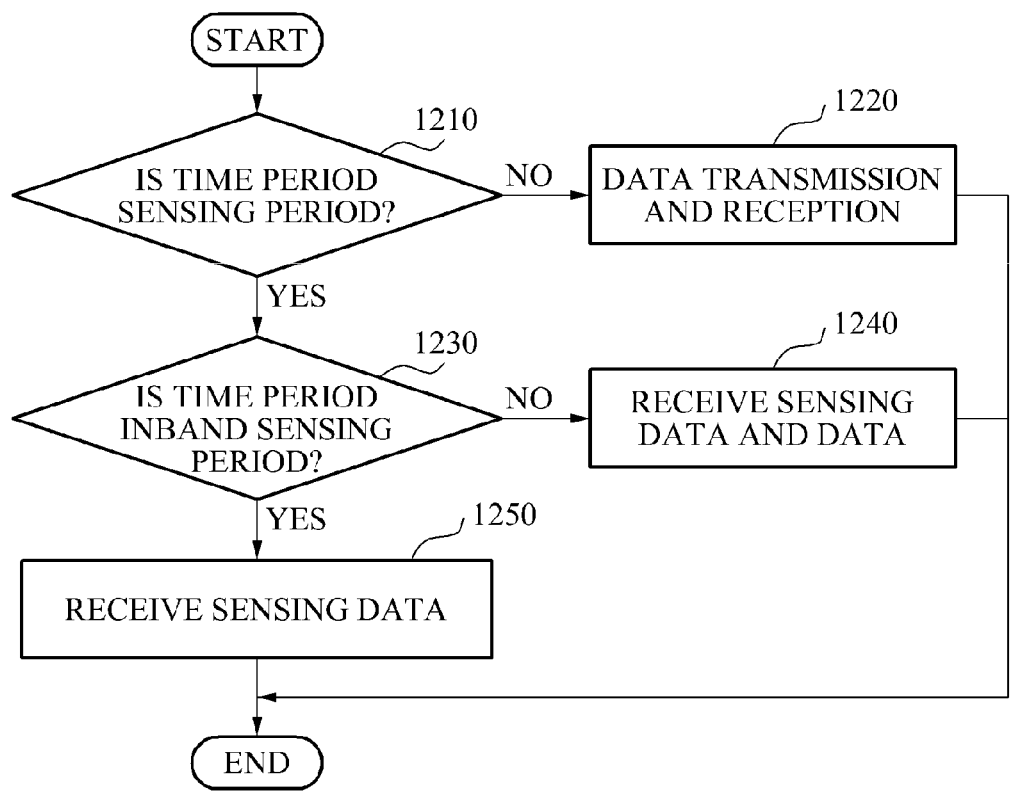
FIG. 12 is a flowchart illustrating an example of utilizing a sensing antenna as a data transceiver antenna, depending on a condition.

FIG. 12 is a flowchart illustrating an example of utilizing a sensing antenna as a data transceiver antenna, depending on a condition.

Referring to FIG. 12, the sensing signal processing unit 930 determines whether a time period is a sensing period in operation 1210. When the time period is different from a period for a sensing data reception, the sensing antenna 910 may be connected to the data transceiver 950 to transmit or to receive data in operation 1220. Although the time period is the sensing period, the sensing signal processing unit 930 determines whether the time period is an in-band sensing period, such as a transmission QP and the like in operation 1230. When the time period is different from the in-band sensing period, the sensing antenna 910 receives sensing data in an out-band, and may receive data in an in-band in operation 1240. When the time period is the in-band sensing period, the sensing antenna 910 is utilized for receiving the sensing data in operation 1250. In this case, a sensing schedule in a wireless communication system is predetermined and thus, only when a dynamic connection between the sensing antenna and the data transceiver is performed, may the described utilization be easily embodied.

FIG. 13 illustrates, based on time, an operation when a sensing antenna is utilized as a data transceiver antenna, depending on a case.

Referring to FIG. 13, the sensing antenna 910 receives sensing data through the sensing receiver 920 in an out-band and simultaneously performs a data transmission and reception through the data transceiver 950 in an in-band and thus, a efficiency of a system may be improved. A time period that is not utilized for a sensing reception, such as 'B' generated when a conventional method is utilized, may be utilized for a data transmission and reception and thus, a performance of the data transmission and reception may be improved. When a plurality of data transceivers exist, a first data transceiver may be connected to a data transceiver antenna and a second data transceiver may be connected to a sensing antenna and thus, may be utilized in the same manner as the above description and may be utilized in a number of different manners.

Figure 14:
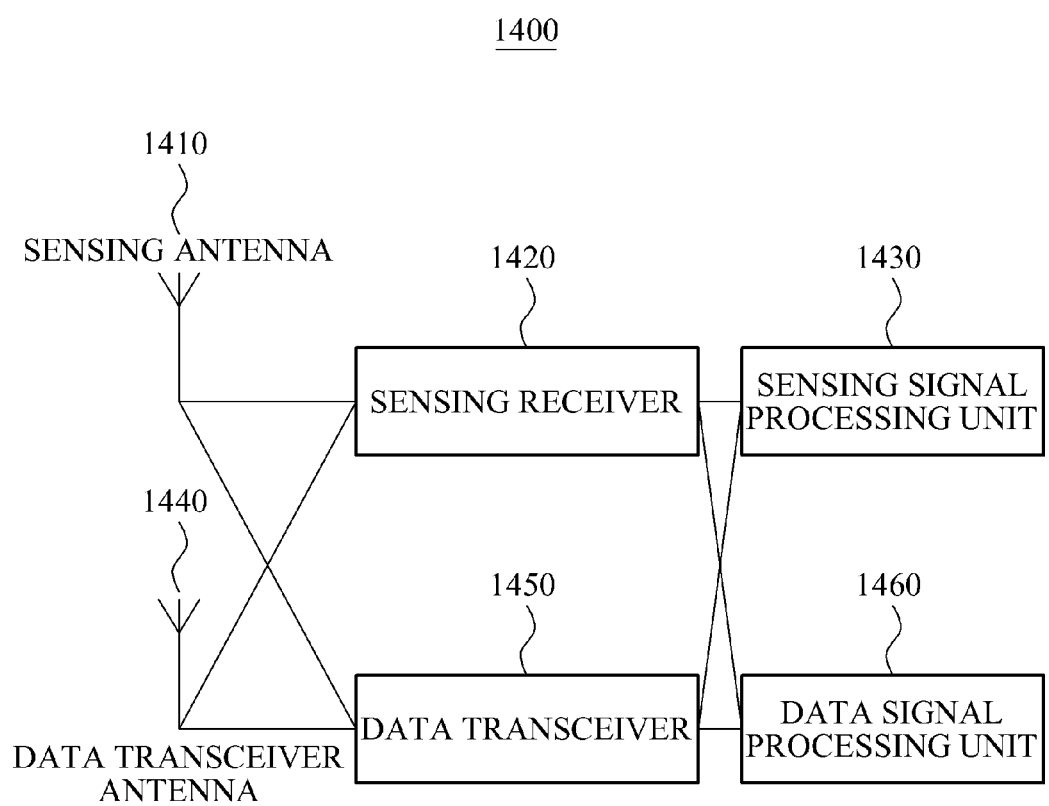
FIG. 14 is a block diagram illustrating a wireless communication system that simultaneously shares a data transceiver, a data transceiver antenna, a sensing receiver, and a sensing antenna.

FIG. 14 illustrates a wireless communication system 1400 that simultaneously shares a data transceiver, a data transceiver antenna, a sensing receiver, and a sensing antenna.

Referring to FIG. 14, the wireless communication system 1400 utilizes a data transceiver 1450 as a sensing receiver, utilizes the sensing receiver 920 as a data transceiver, utilizes a data transceiver antenna 1440 as a sensing antenna, or utilizes the sensing antenna 1410 as a data transceiver antenna, and thus, various sharing methods may be embodied in addition to the above described methods.

When a data transceiver 1450 is utilized as a sensing receiver, the data transceiver 1450 may transmit received sensing data to a sensing signal processing unit 1430. When the sensing receiver 920 is utilized as a data transceiver 950, the sensing receiver 920 may transmit received data to a data signal processing unit 1460.

The descriptions described with reference to FIGS. 3 through 13 are applicable to the wireless communication system of FIG. 14, and thus, descriptions thereof are omitted.

The method according to the above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of sharing a data transceiver and a sensing receiver, the method comprising:
    utilizing the data transceiver with the sensing receiver to receive sensing data by:
        determining whether a current time period is a data transmission-and-reception period;
        determining whether the current time period is a transmission quiet period (QP), when the current time period is different from the data transmission-and-reception period; and
        utilizing the data transceiver with the sensing receiver to receive the sensing data when the current time period is the transmission QP; and
    utilizing the sensing receiver with the data transceiver to receive data.

2. The method of claim 1, wherein the utilizing of the data transceiver with the sensing receiver to receive the sensing data comprises:
    setting the data transceiver to an in-band sensing mode to receive the sensing data; and
    transmitting, by the data transceiver, the received data to a sensing signal processing unit associated with the sensing receiver.

3. The method of claim 1, further comprising:
    determining whether a sensing schedule associated with the data transceiver exists when the current time period is different from the transmission QP;
    receiving, by the data transceiver, the sensing data according to the sensing schedule when the sensing schedule exists; and
    receiving, by the data transceiver, the sensing data according to a schedule and a channel which are the same as the sensing receiver when the sensing schedule does not exist.

4. The method of claim 1, wherein the utilizing of the sensing receiver with the data transceiver to receive the data comprises:
    determining whether a current time period is a sensing period;
    determining the current time period is a data transmission-and-reception period when the current time period is different from the sensing period; and
    utilizing the sensing receiver with the data transceiver to receive the data when the current time period is the data transmission-and-reception period and a time period of a CR device including the sensing receiver is a data reception period.

5. The method of claim 4, further comprising one of
transmitting data when the time period of the CR device is a data transmission period and the sensing receiver includes a transmission function, and
standing by when the time period of the CR device is the data transmission period and the sensing receiver only includes a reception function.

6. The method of claim 1, wherein the utilizing of the sensing receiver with the data transceiver to receive the data comprises:
transmitting, by the sensing receiver, the received data to a signal processing unit associated with the data transceiver.

7. A method of sharing a data transceiver antenna and a sensing antenna, the method comprising:
connecting the data transceiver antenna with a sensing receiver to receive sensing data by:
determining whether a current time period is a data transmission-and-reception period; and
connecting the data transceiver antenna with the sensing receiver to receive the sensing data when the current time period is different from the data transmission-and-reception period; and
connecting the sensing antenna with a data transceiver to transmit or to receive data.

8. The method of claim 7, further comprising:
connecting the data transceiver antenna with the data transceiver to transmit data when the time period is both the data transmission-and-reception period and the data transmission period.

9. The method of claim 7, further comprising:
when the time period is both the data transmission-and-reception period and the data reception period, performing one of connecting the data transceiver antenna with the data transceiver to receive data in an in-band and connecting the data transceiver antenna with the sensing receiver to receive the sensing data in an out-band.

10. The method of claim 7, wherein the connecting of the sensing antenna with the data transceiver to transmit or to receive the data comprises:
determining whether a current time period is a sensing period; and
connecting the sensing antenna with the data transceiver to transmit or to receive the data when the current time period is different from the sensing period.

11. The method of claim 10, further comprising:
when the current time period is the sensing period and is different from an in-band sensing period, performing one of connecting the sensing antenna with the sensing receiver to receive sensing data in an out-band and connecting the sensing antenna with the data transceiver to receive the data in an in-band.

12. The method of claim 10, further comprising:
connecting the sensing antenna with the sensing receiver to receive sensing data according to a sensing schedule, when the current time period is both the sensing period and an in-band sensing period.

13. A wireless communication system that uses a data transceiver to sense data or uses a sensing receiver to receive data, the system comprising:
a signal processing unit to determine whether a current time period is a data transmission-and-reception period;
a data transceiver to transmit or to receive data when the current time period is the data transmission-and-reception period, and to receive sensing data when the current time period is different from the data transmission-and-reception period and is a transmission QP;
a sensing signal processing unit to determine whether the current time period is a sensing period; and
a sensing receiver to receive the sensing data when the current time period is the sensing period, and to receive the data, together with the data transceiver, when the current time period is the data transmission-and-reception period as opposed to being the sensing period and a time period of a CR device including the sensing receiver is a data reception period.

14. The wireless communication system of claim 13, wherein:
the data signal processing unit determines whether a sensing schedule associated with the data transceiver exists when the current time period is different from the transmission QP; and
the data transceiver receives the sensing data according to a sensing schedule when the sensing schedule exists and receives the sensing data according to a schedule and a channel that are the same as the sensing receiver when the sensing schedule does not exist.

15. The wireless communication system of claim 13, wherein the sensing receiver stands by when the current time period is different from the sensing period and is different from the data transmission-and-reception period, transmits the data when the time period of the CR device is the data transmission period and includes only a transmission function, and stands by when the time period of the CR device is the data transmission period and includes only a reception function.

16. The wireless communication system of claim 15, further comprising:
a data transceiver antenna to perform:
connecting with the sensing receiver to receive the sensing data when the current time period is different from the data transmission-and-reception period,
connecting with the data transceiver to transmit the data when the current time period is both the data transmission-and-reception period and the data transmission period, and
connecting with the data transceiver to receive the data in an in-band or connecting with the sensing receiver to receive the sensing data in an out-band, when the current time period is both the data transmission-and-reception period and the data reception period.

17. The wireless communication system of claim 13, further comprising:
a sensing antenna to perform:
connecting with the data transceiver to transmit or to receive the data when the current time period is different from the sensing period,
connecting with the sensing receiver to receive the sensing data in an out-band or connecting with the data transceiver to receive the data in an in-band, when the current time period is the sensing period and is different from an in-band sensing period, and
connecting with the sensing receiver to receive the sensing data according to a sensing schedule when the current time period is both the sensing period and the in-band sensing period.

* * * * *